(12) United States Patent
Bledowski

(10) Patent No.: US 11,829,106 B2
(45) Date of Patent: Nov. 28, 2023

(54) CONJUGATE SUPPRESSION

(71) Applicant: Envisics Ltd, Milton Keynes (GB)

(72) Inventor: Ian Bledowski, Milton Keynes (GB)

(73) Assignee: Envsics Ltd, Milton Keynes (GB)

( * ) Notice: Subject to any disclaimer, the term of this patent is extended or adjusted under 35 U.S.C. 154(b) by 1 day.

(21) Appl. No.: 17/107,094

(22) Filed: Nov. 30, 2020

(65) Prior Publication Data

US 2021/0191320 A1 Jun. 24, 2021

(30) Foreign Application Priority Data

Dec. 18, 2019 (GB) .................................. 1918694

(51) Int. Cl.
G03H 1/20 (2006.01)
G03H 1/22 (2006.01)

(52) U.S. Cl.
CPC ......... *G03H 1/2294* (2013.01); *G03H 1/2205* (2013.01); *G03H 2001/221* (2013.01); *G03H 2001/2236* (2013.01); *G03H 2222/34* (2013.01)

(58) Field of Classification Search
CPC .......... G03H 1/2294; G03H 1/26; G03H 1/02; G03H 1/2205; G03H 1/16; G03H 1/30;
(Continued)

(56) References Cited

U.S. PATENT DOCUMENTS

| 2010/0045775 A1* | 2/2010 | Haussler | G03H 1/26 359/32 |
| 2010/0103486 A1* | 4/2010 | Kroll | G03H 1/2205 359/9 |

(Continued)

FOREIGN PATENT DOCUMENTS

| EP | 1550923 A1 | 7/2005 |
| EP | 2030072 A1 | 3/2009 |

(Continued)

OTHER PUBLICATIONS

Combined Search and Examination Report for GB Application No. 1918694.9, dated Jun. 8, 2020, 4 pages.

*Primary Examiner* — Audrey Y Chang

(74) *Attorney, Agent, or Firm* — McDonnell Boehnen Hulbert & Berghoff LLP

(57) ABSTRACT

A holographic projector and method of holographic projection is disclosed. A first array of light-modulating pixels displays a first hologram and a second array of light-modulating pixels displays second hologram. A first light source illuminates the first array of pixels such that a first holographic reconstruction, comprising a first zero-order replay field, is formed on a replay plane and a second light source illuminates the second array of pixels such that a second holographic reconstruction, comprising a second zero-order replay field, is formed on the replay plane. Real image content of the first holographic reconstruction is restricted to a first sub-area of the first zero-order replay field and real image content of the second holographic reconstruction is restricted to a first sub-area of the second zero-order replay field. The holographic projector is arranged such that the first zero-order replay field and the second zero-order replay field are no more than partially overlapping. The first sub-area of the first zero-order replay field and the first sub-area of the second zero-order replay field form a continuous display area of the holographic projector.

18 Claims, 14 Drawing Sheets

(58) Field of Classification Search
CPC ..... G03H 2001/221; G03H 2001/2236; G03H 2222/34; G03H 2001/2223; G03H 2001/2505; G03H 2001/2625
USPC .................................................. 359/9, 10, 32
See application file for complete search history.

(56) References Cited

U.S. PATENT DOCUMENTS

| | | | | |
|---|---|---|---|---|
| 2010/0277566 | A1* | 11/2010 | Cable | G03H 1/02 |
| | | | | 348/40 |
| 2013/0057935 | A1* | 3/2013 | Joo | G03H 1/16 |
| | | | | 359/10 |

FOREIGN PATENT DOCUMENTS

| | | | |
|---|---|---|---|
| GB | 2498170 A | 7/2013 | |
| GB | 2501112 A | 10/2013 | |

\* cited by examiner

CONJUGATE SUPPRESSION

CROSS-REFERENCE TO RELATED APPLICATIONS

This application claims the benefit of priority of United Kingdom Patent Application no. 1918694.9, filed Dec. 18, 2019, which is hereby incorporated herein by reference in its entirety.

FIELD

The present disclosure relates to a projector. More specifically, the present disclosure relates to a holographic projector, a method of holographic projection and holographic projection system. Some embodiments relate to a head-up display and a head-mounted display. Some embodiments relate to the suppression of conjugate image content in a holographic reconstruction formed in a holographic replay field.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is provided a holographic projector comprising a first array of light-modulating pixels arranged to display a first hologram and a second array of light-modulating pixels arranged to display a second hologram. A first light source is arranged to illuminate the first array of light-modulating pixels such that a first holographic reconstruction corresponding to the first hologram is formed on a replay plane. A second light source is arranged to illuminate the second array of light-modulating pixels such that a second holographic reconstruction corresponding to the second hologram is formed on the replay plane. The first holographic reconstruction comprises a first zero-order replay field and the second holographic reconstruction comprises a second zero-order replay field. The holographic projector is arranged such that the first zero-order replay field and the second zero-order replay field are no more than partially overlapping. Real image content of the first holographic reconstruction is restricted to a first sub-area of the first zero-order replay field and real image content of the second holographic reconstruction is restricted to a first sub-area of the second zero-order replay field. The first sub-area of the first zero-order replay field and the first sub-area of the second zero-order replay field form a continuous display area of the holographic projector.

In some embodiments, a second sub area of the first zero-order replay field is restricted to conjugate image content of the first holographic reconstruction, and a second sub area of the second zero-order replay field is restricted to conjugate image content of the second holographic reconstruction. The first sub area of the first zero-order replay fields and the first sub area of the second zero-order replay field form a continuous display area which is visible to a viewer and excludes conjugate image content of the first zero-order replay field and the second zero-order replay field.

In some embodiments, the first sub-area of the first zero-order replay field and the first sub-area of the second zero-order replay field are adjacent, more specifically immediately adjacent.

A holographic reconstruction of a hologram displayed by an array of light modulating pixels is formed in a replay field on a replay plane. One consequence of displaying the hologram on an x-y array of pixels is that the holographic replay field is repeated in the x and y directions on the replay plane. It is conventional to use the centrally located zero-order replay field in a device because it is the brightest replay field, and to block out the higher order replay fields using masks, baffles and the like. This avoids the problem of undesirable ghost images appearing on the replay plane, due to the higher order replay fields, when viewed by a viewer. However, a consequence of holography is that the holographic reconstruction formed in each replay field contains not only an image, herein called "real image", corresponding to the displayed hologram but also a so-called "conjugate image". The conjugate image is a reflection of the real image about the centre of the replay field and is less bright than the real image. Techniques are known for suppressing the brightness of the conjugate image (e.g. as part of the hologram calculation process or the SLM calibration process) but it cannot be entirely eliminated. The conjugate image of the zero-order replay field may therefore be seen as an inverted ghost image when viewed by a viewer.

In accordance with embodiments of the present disclosure, a viewing window (herein also called "active area" or "viewing area") is formed from respective first sub-areas of first and second zero-order replay fields formed by illuminating first and second arrays of light modulating pixels displaying respective first and second holograms. The first sub area of the first zero-order replay field contains the real image of a first holographic reconstruction of the first hologram displayed by the first array of light modulating pixels. The first sub area of the second zero-order replay field contains the real image of a second holographic reconstruction of the second hologram displayed by the second array of light modulating pixels. The real images of the first and second holographic reconstructions in the respective first and second zero-order replay fields in the viewing window correspond to the desired image content for viewing by a viewer. A second sub area of the first zero-order replay field contains the conjugate image of the first holographic reconstruction and is outside the viewing window. A second sub area of the second zero-order replay field contains the conjugate image of the second holographic reconstruction and is outside the viewing window. In this way, the conjugate images of the first and second zero-order replay fields do not appear in the image content in the viewing window that is visible to a viewer.

In some embodiments, sub areas of the first and second zero-order replay fields that are outside the viewing window, such as the second sub areas of the first and second zero-order replay fields, are masked out. This prevents the conjugate image content from appearing in the image content that is visible to a viewer. In some embodiments, the viewing window is imaged by an optical relay system, wherein the optical relay system is configured to exclude light outside the viewing window. For example, the optical relay system may be configured such that it does not accept light outside the viewing window.

In some embodiments, the first light source illuminating the first array of light modulating pixels is positioned and/or angled differently to the second light source illuminating the second array of light modulating pixels. For example, the angle of incidence of light of the first light source on the first array of light-modulating pixels is different to the angle of incidence of light of the second light source on the second array of light-modulating pixels. In particular, the first and second light sources are arranged such that the first zero-order replay field, formed by the pixels illuminated by the first light source, is spatially displaced relative to the second zero-order replay field, formed by the pixels illuminated by the second light source. For example, the second zero-order replay field is spatially displaced from the first zero-order replay field in the y direction.

In some embodiments, the first zero-order replay field and second zero-order replay field are immediately adjacent. For example, the bottom edge of the first zero-order replay field may be substantially aligned with the top edge of the second zero-order replay field. It may be said that the spatial displacement between the first zero-order replay field and the second zero-order replay field (e.g. in the y direction) may correspond to the dimension of a single replay field (e.g. in the y direction). In one example, the first sub area of the first zero-order replay field may be immediately adjacent the first sub area of the second zero-order replay field. Thus, the viewing window may comprise contiguous first sub areas of the first and second zero-order replay fields of the respective first and second holographic reconstructions.

In some embodiments, the desired image content comprises far field image content and near field image content.

The first sub area of the first zero-order replay field may comprise a real image corresponding to far field image content. The first sub area of the second zero-order replay field may comprise a real image corresponding to near field image content. The first zero-order replay field may be located above and adjacent, more specifically immediately adjacent, the second zero-order replay field. In one example, the first sub area of the first zero-order replay field may comprise a lower area thereof, and the first sub area of the second zero-order replay field may comprise an upper area thereof. Thus, the far field image content appears in the viewing window immediately above the near field image content.

When the viewing window includes the first sub area of the first zero-order replay field immediately adjacent the first sub area of the second zero-order replay field in the y direction, conjugate images of higher order replay fields may be formed within the viewing window. In one example, the conjugate image of the second holographic reconstruction in the (0, +1) replay field may overlap/coincide with the first sub area of the first zero-order replay field in the viewing window. Similarly, the conjugate image of the first holographic reconstruction in the (0, −1) replay field may overlap/coincide with the first sub area of the second zero-order replay field in the viewing window.

Accordingly, in other embodiments, the first zero-order replay field and second zero-order replay field are partially overlapping. In one example, the second zero-order replay field may partially overlap the first zero-order replay field in the y direction. Owing to the overlap, the viewing window may be repositioned, and optionally may be resized. In some embodiments, the size of the area of the second zero-order replay field contained in the viewing window is greater than the size of the area of the first zero-order replay field contained in the viewing window. It may be said that the viewing window includes more of the second zero-order replay field than the first zero-order replay field.

Partially overlapping the first and second zero-order replay fields may reduce the intensity of the conjugate images of the higher order replay fields formed in the viewing window.

In some embodiments, the light modulating pixels are shaped such that the brightness profile of each holographic reconstruction is a sinc function in at least one direction of the replay plane. In one example, the light modulating pixels are square. Diffraction by a square aperture leads to an intensity/brightness profile in the form of a sinc function. In particular, the intensity profile in each of the x and y directions comprises a sinc function across the entire replay area (i.e. all replay fields), centred at the centre of the zero-order replay field. Thus, the intensity profile in each of the x and y directions comprises intensity maxima and intensity minima corresponding to the maxima and minima of the sinc function.

In some embodiments, the position of the first sub area of the second zero-order replay field is based on the brightness profile of the first holographic reconstruction. In some examples, the first sub area of the second zero-order replay field is positioned relative to the brightness profile of the first holographic reconstruction in order to supress the brightness of higher order conjugate image content of the first holographic reconstruction within the first sub area of the second zero-order replay field.

In some examples, the second zero-order replay field may partially overlap the first zero-order replay field in the y direction so that the conjugate image of the first holographic reconstruction on the (0, −1) replay field is aligned with a minimum in the brightness profile of the first holographic reconstruction. It may be said that the first sub area of the second zero-order replay field is substantially aligned with a minimum in the brightness profile of the first holographic reconstruction.

By overlapping the first and second replay fields so as to align the first sub area of the second zero-order replay field with a minimum in the brightness profile of the first holographic reconstruction, the brightness of the overlapping/coinciding conjugate image of the first holographic reconstruction on the (0, −1) replay field is minimised.

In some embodiments, when overlapping the first and second zero-order replay fields, the size of the viewing window (in the y dimension) may be reduced, in order to exclude the entire conjugate image of the first zero-order replay field.

The relative displacement of the first and second zero-order replay fields (e.g. in the y direction), and thus the overlap, can be achieved by, for example, by suitably positioning/angling one the first and second light sources relative to the other. In embodiments, the angle of incidence of light of the first light source on the first array of light-modulating pixels is different to the angle of incidence of light of the second light source on the second array of light-modulating pixels in order to achieve the relative position between the first sub-area of the second zero-order replay field and the brightness profile of the first holographic reconstruction.

In some embodiments, the first array of light modulating pixels and the second array of light modulating pixels are formed on the same spatial light modulator. In other embodiments, the first array of light modulating pixels is formed on the different spatial light modulator from the second array of light modulating pixels.

There is also provided a method for reducing the appearance of conjugate images in a holographic reconstruction formed on a replay plane. The method comprises displaying a first hologram on a first array of light modulating pixels, and displaying a second hologram on a second array of light modulating pixels. The method further comprises illuminating the first array of light modulating pixels using a first light source so as to form a first holographic reconstruction corresponding to the first hologram on the replay plane, and illuminating the second array of light modulating pixels using a second light source so as to form a second holographic reconstruction corresponding to the second hologram on the replay plane. The first holographic reconstruction comprises a first zero-order replay field and the second holographic reconstruction comprises a second zero-order replay field. The real image content of the first holographic reconstruction is restricted to a first sub area of the first zero-order replay field, and the real image content of the second holographic reconstruction is restricted to a first sub area of the second zero-order replay field. The method further comprises positioning the first zero-order replay field relative to the second zero-order replay field to be no more than partially overlapping. The positioning of the first zero-order replay field and the second zero-order replay field is such that the first sub area of the first zero-order replay field and the first sub area of the second zero-order replay field form a continuous display area.

In some embodiments, a second sub area of the first zero-order replay field is restricted to conjugate image content of the first holographic reconstruction, and a second sub area of the second zero-order replay field is restricted to conjugate image content of the second holographic reconstruction. The continuous display area formed by the first sub area of the first zero-order replay field and the first sub area of the second zero-order replay field is visible to a viewer and excludes conjugate image content of the first zero-order replay field and the second zero-order replay field.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality of diffracted orders wherein each diffracted order is a replica of the zeroth-order replay field (also called "zero-order replay field"). The zeroth-order replay field generally corresponds to the preferred or primary replay field because it is the brightest replay field. The term "replay plane" is used to refer to the plane in space containing all the replay fields. The terms "image" "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The terms "image" and "image content" are used interchangeably herein.

Although different embodiments may be disclosed separately in the detailed description which follows, any feature of any embodiment may be combined with any other feature or combination of features of any other embodiment. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
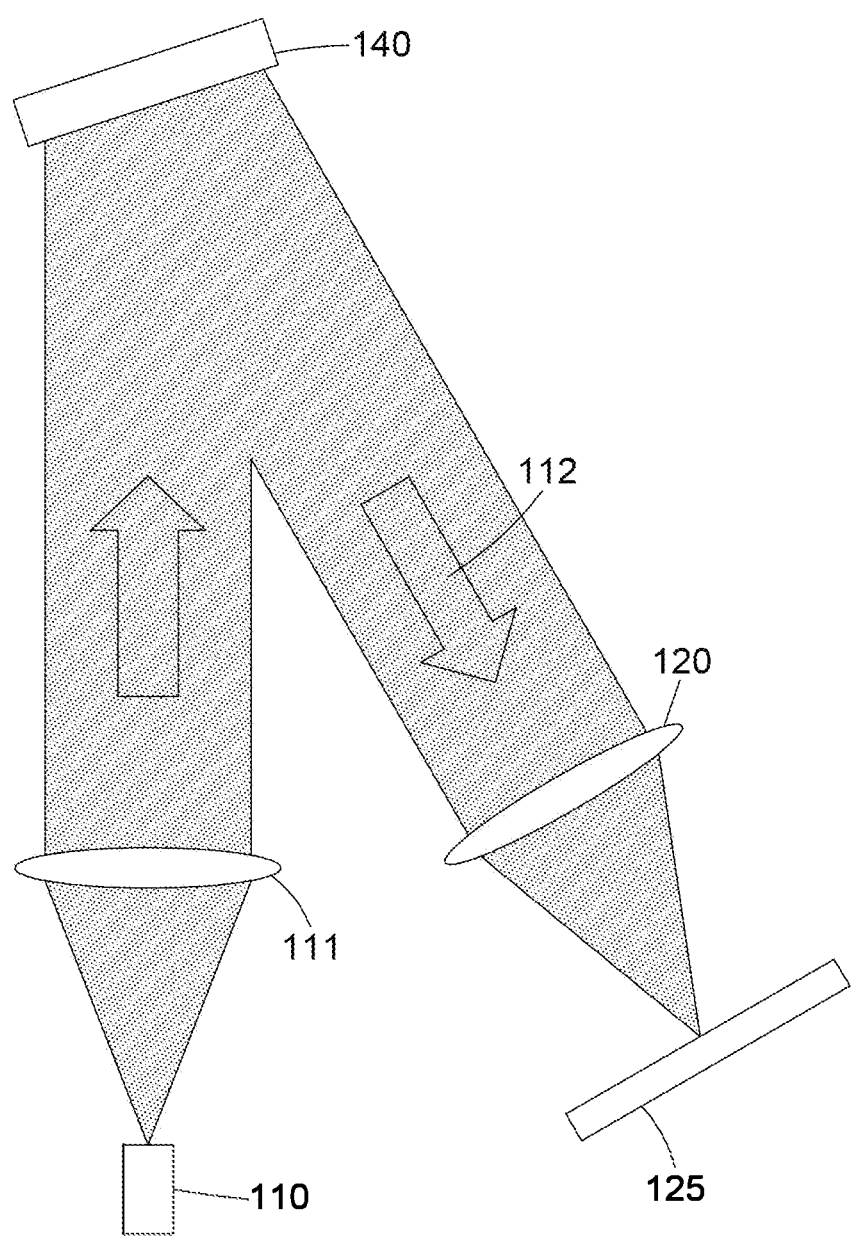
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). By varying the angle of incidence of light of the wavefront on the SLM 140, it is possible to vary the x-y position of the holographic reconstruction/replay field on the replay plane. However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
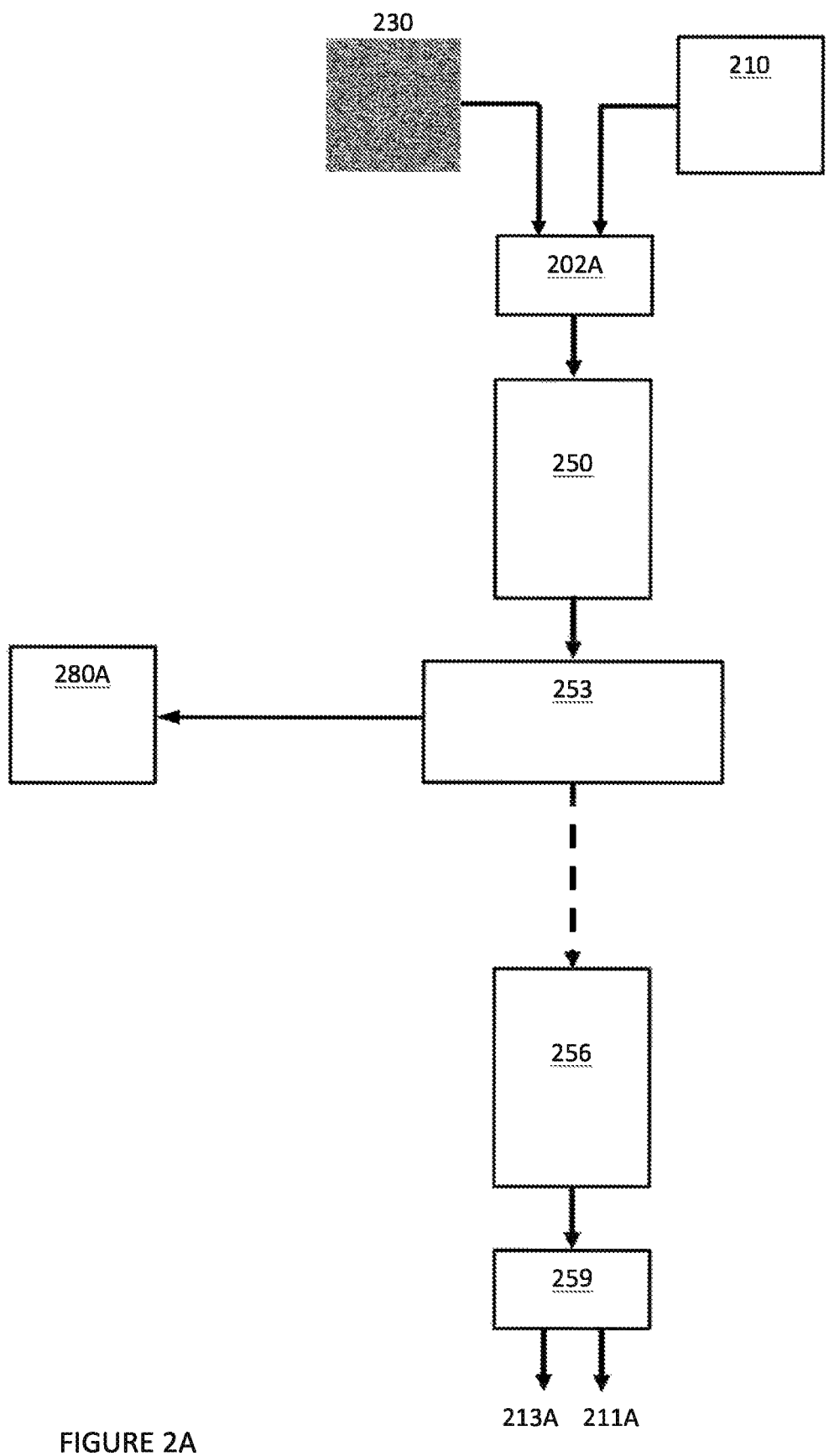
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
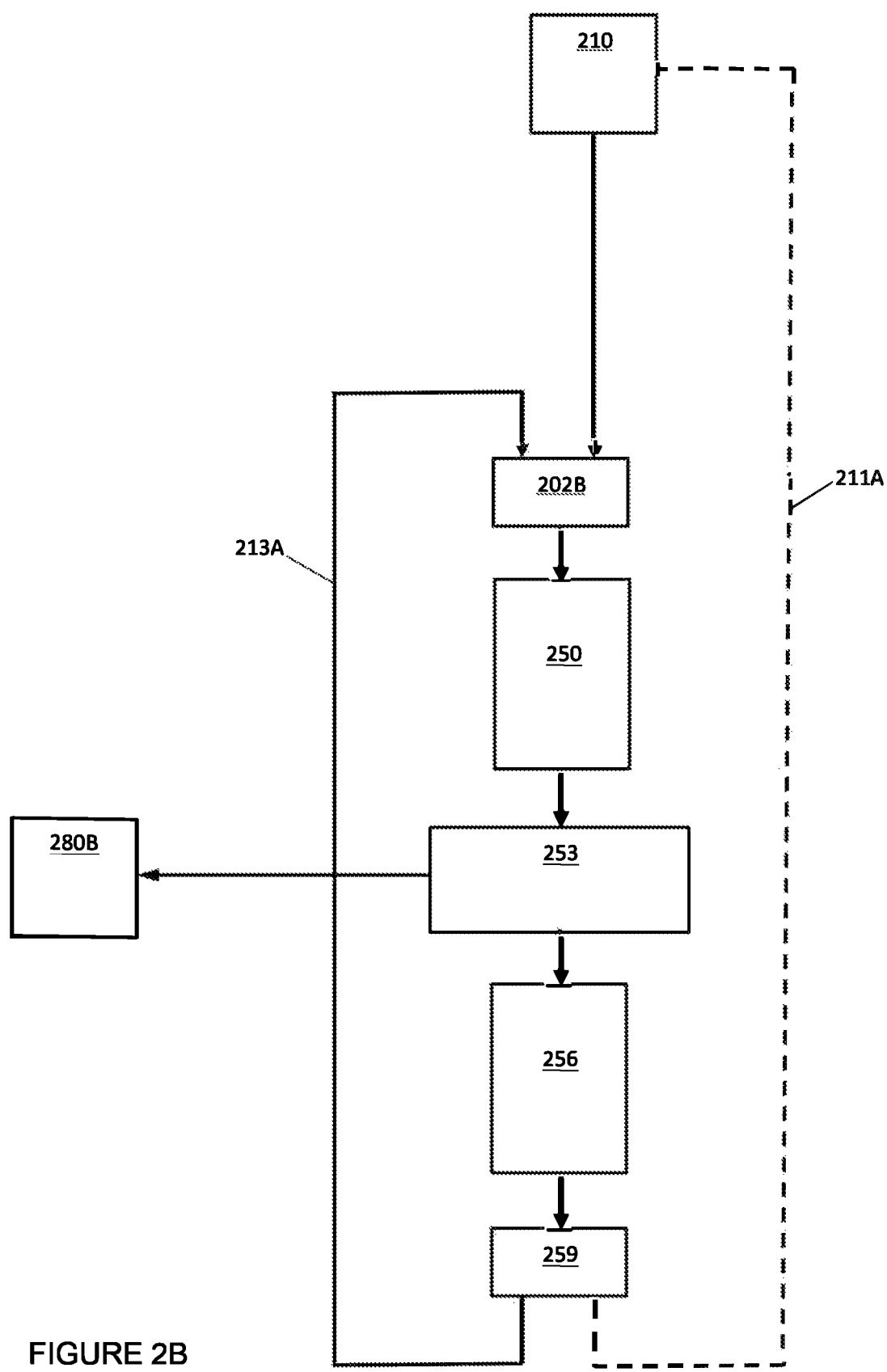
FIG. 2B illustrates the second and subsequent iterations of the example Gerchberg-Saxton type algorithm.

FIG. 2B represents a second iteration of the algorithm and any further iterations. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
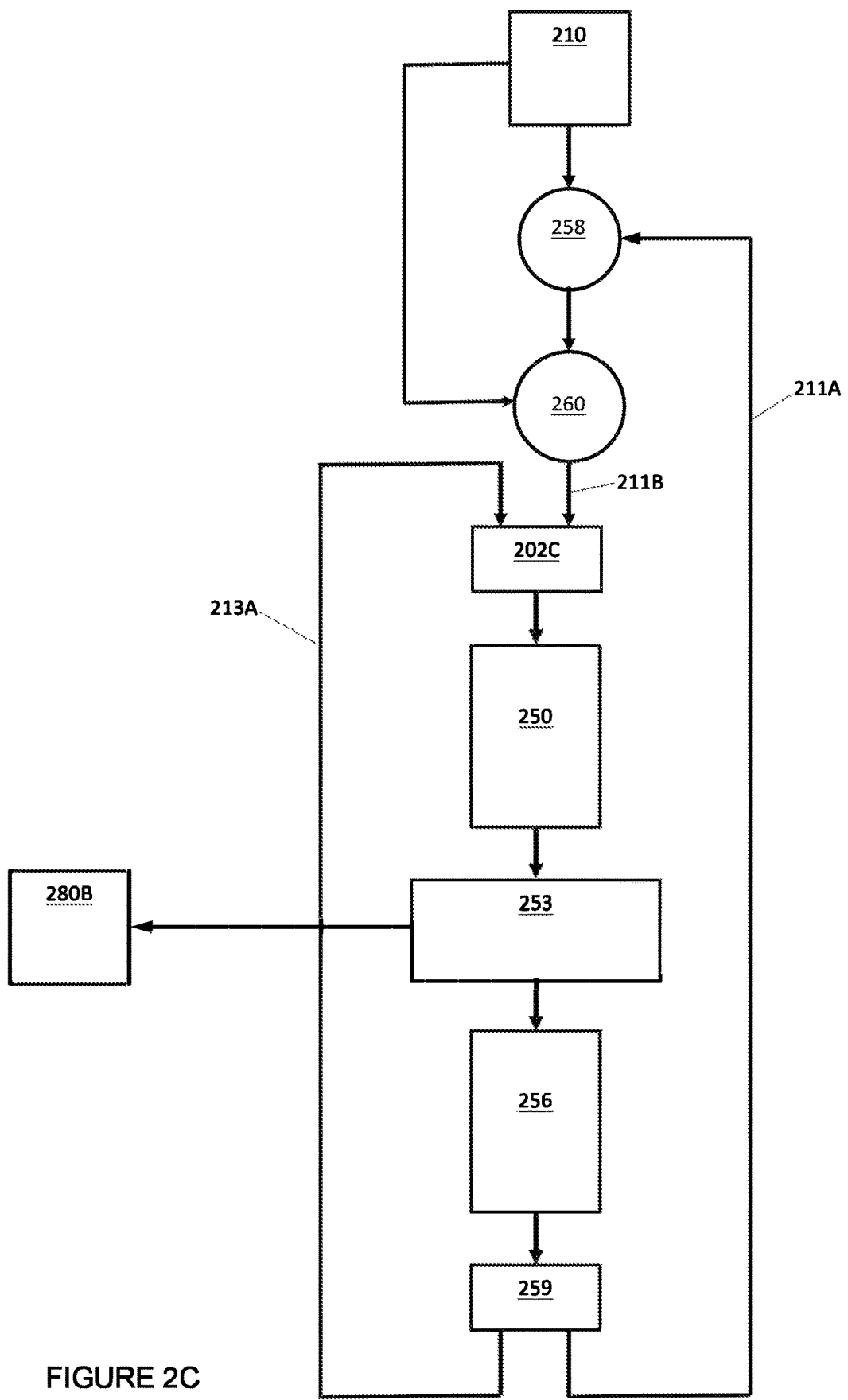
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
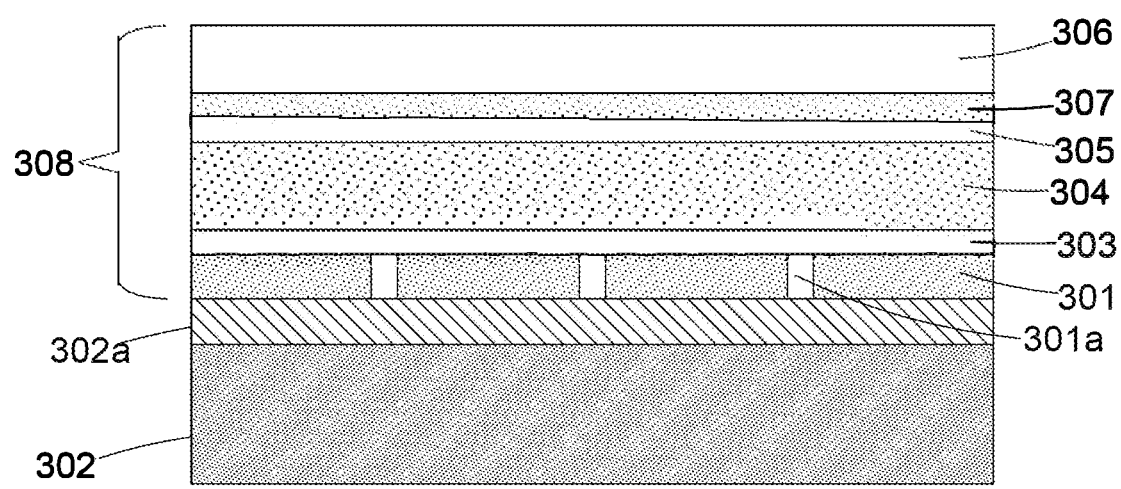
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Holographic Replay Field

Figure 4:
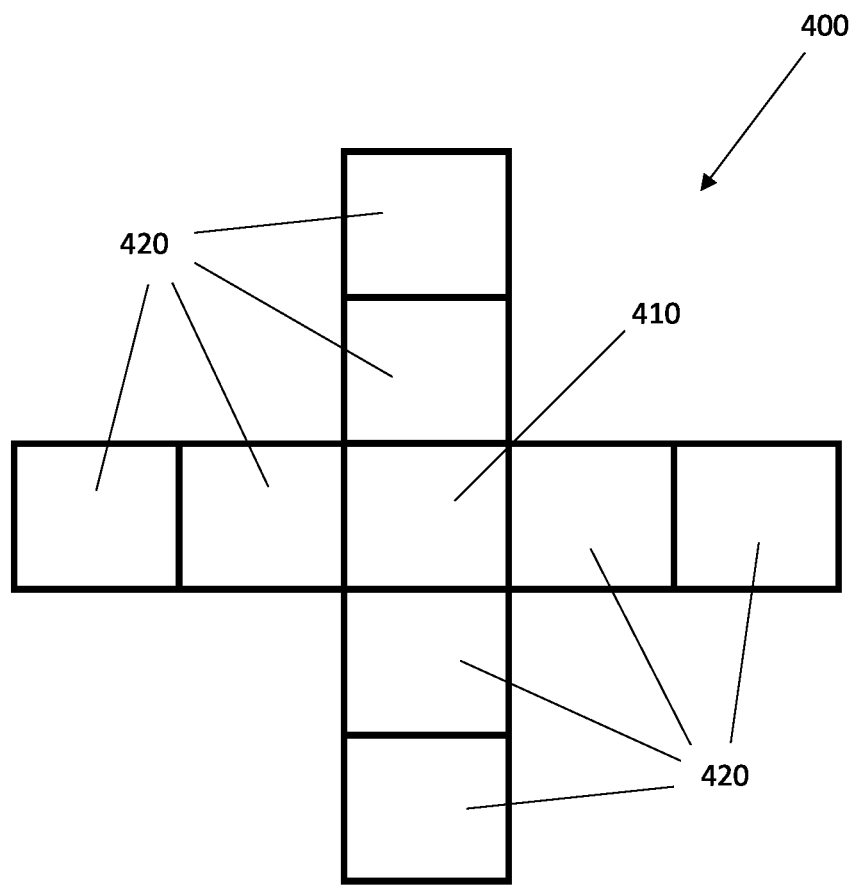
FIG. 4 is an outline schematic of a zero-order replay field and a plurality of higher order replay fields of a holographic reconstruction formed on a replay plane.

FIG. 4 shows the outline of a holographic replay field 400 formed on a replay plane by a two-dimensional array of light modulating pixels of a spatial light modulator, such as the above-described LCOS SLM. As illustrated, a zero-order replay field 410 is formed at the centre, and a plurality of higher order replay fields 420, which repeat the zero-order replay field 410, are formed in the x and y directions. As indicated previously, in display applications, it is conventional to block out the higher order replay fields using masks, baffles and the like, so that only the brightest, zero-order replay field is visible to a viewer.

Figure 5:
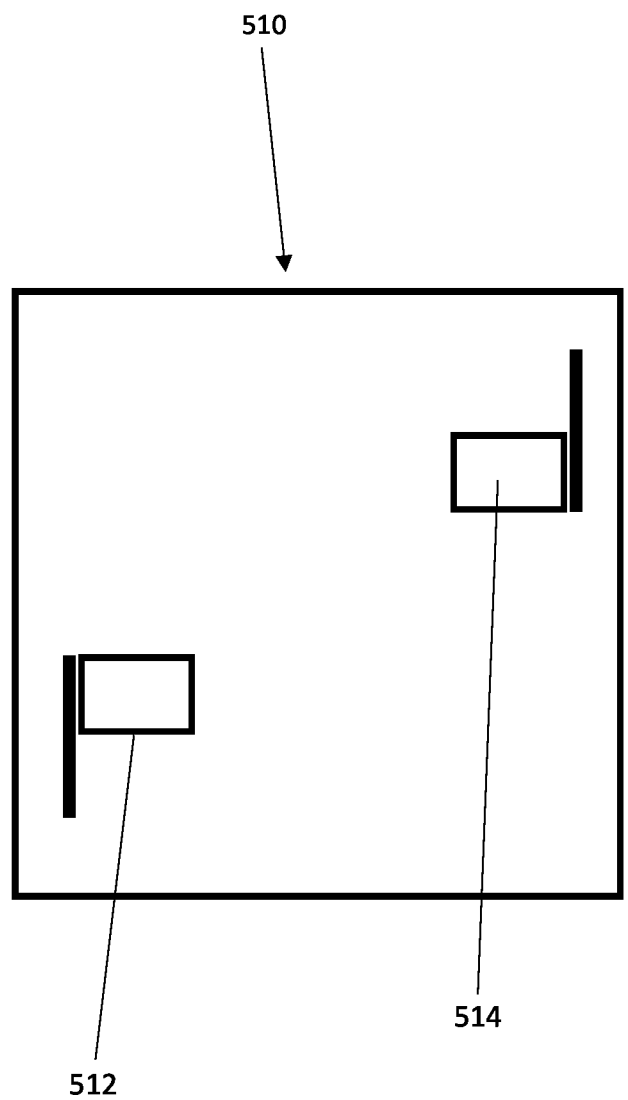
FIG. 5 shows a replay field comprising real image content and conjugate image content.

FIG. 5 shows an example of image content formed in an individual replay field 510, for example the zero-order replay field shown in FIG. 4. In particular, the replay field 510 comprises real image content 512 which may be referred to as the "real image". In the example, the real image content 512 comprises an image of a flag in an upright configuration positioned in the lower left-hand corner of the replay field 510. In addition, the replay field 510 comprises conjugate image content 514 which may be referred to as the "conjugate image". The formation of conjugate image content in each replay field of the holographic reconstruction is a consequence of holography. The conjugate image content is a reflection of the real image content about the centre of the replay field and is typically less bright than the real image. Thus, in the example, the conjugate image content 514 comprises an image of the flag in an inverted configuration positioned in the top right-hand corner of the replay field 510. The conjugate image 514 has lower intensity (i.e. is less bright) that the real image 512.

In prior holographic display applications, attempts have been made to suppress the conjugate image formed in the utilised (e.g. zero-order) replay field, for example as part of the hologram calculation process or the calibration process of the spatial light modulator. However, these techniques cannot entirely eliminate the conjugate image.

Figure 6:
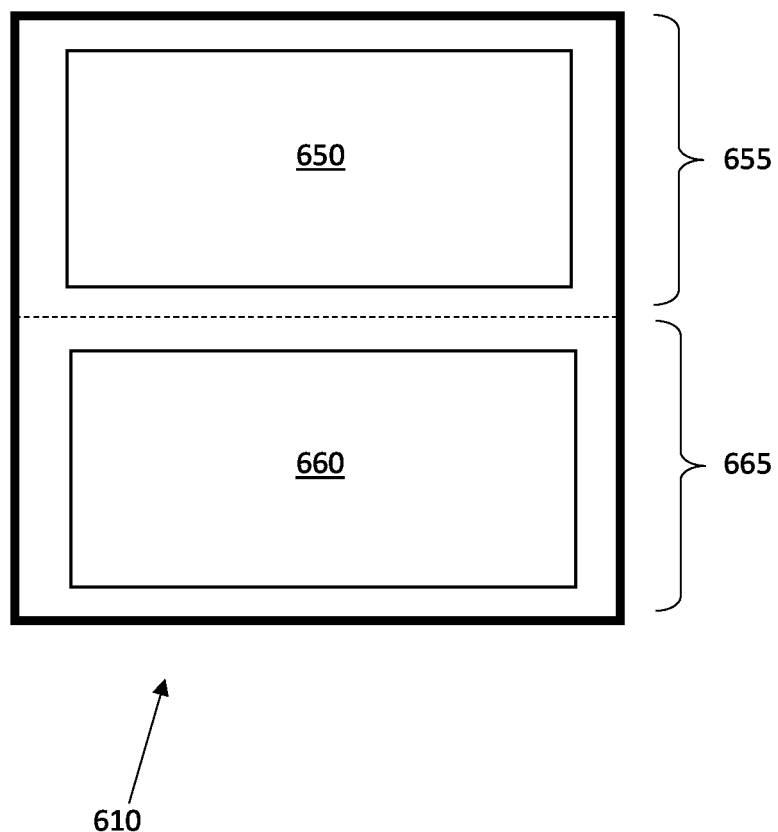
FIG. 6 shows a replay field comprising far field content and near field content.

FIG. 6 shows an arrangement of image content formed in a replay field 610 (e.g. zero-order replay field) suitable for certain display applications. In particular, in some display applications it is desirable to display far field image content and near field image content, wherein far field image content appears to the viewer further away than the near field content owing to an optical relay system (not described in detail herein) that images the utilised (e.g. zero-order) replay field. In some embodiments, far field content 650 is displayed in an upper sub area 655 of the replay field 610, and near field content 660 is displayed in a lower sub area 665 of the replay field 610 as shown in FIG. 6.

Conventionally, a single hologram is calculated and displayed on a spatial light modulator, such that the holographic reconstruction formed in the replay field 610 comprises both far field content 650 and near field content 660 as shown in FIG. 6.

However, a conjugate image of the far field content 650 may appear in the lower sub area 665 of the replay field 610 comprising the real image of the near field content 660. Conversely, a conjugate image of the near field content 660 may appear in the upper sub area 655 of the replay field 610 comprising the real image of the far field content 650. Such conjugate images are therefore seen by the viewer as undesirable ghost images.

First Embodiments—Adjacent First and Second Zero-order Replay Fields

The present disclosure proposes an alternative approach, which may prevent conjugate image content of a holographic reconstruction in the zero-order replay field from appearing to the viewer.

In accordance with the present disclosure, a pair of first and second holographic reconstructions of respective holograms are used together to form the desired image content for display at the replay plane. In particular, a viewing window is formed. The viewing window comprises a first sub area (e.g. lower sub area comprising near field image content) of a first zero-order replay field of a first holographic reconstruction. The viewing window also comprises a first sub area (e.g. upper sub area comprising far field image content) of a second zero-order replay field of a second holographic reconstruction, which may be positioned adjacent (e.g. below) the first zero-order replay field. Thus, the first sub area of the first holographic reconstruction and the first sub area of the second holographic reconstruction may form a continuous display area in the viewing window. The real image content of the first holographic reconstruction is formed in the first sub area thereof, and thus in the viewing window. Likewise, the real image content of the second holographic reconstruction is formed in the first sub area thereof, and thus in the viewing window. The conjugate image content of the first zero-order replay field is formed outside the first sub area thereof, for example in a second sub area, and thus outside the viewing window. Likewise, the conjugate image content of the second zero-order replay field is formed outside the first sub area thereof, for example in a second sub area, and thus outside the viewing window. When only the image content inside the viewing window is visible on the replay plane (e.g. by masking areas outside the viewing window as described above), the conjugate image content of both zero-order replay fields is not visible to the viewer.

Figure 7:
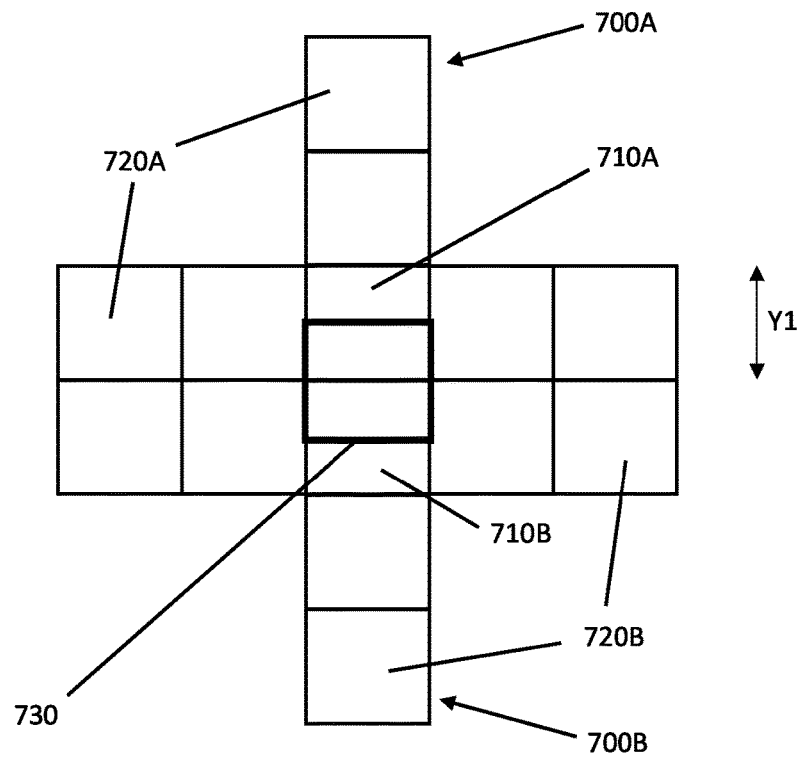
FIG. 7 shows a first holographic reconstruction formed on a replay plane positioned relative to a second holographic reconstruction formed on the replay plane in accordance with embodiments.
Figure 7:
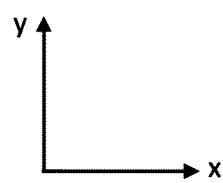

FIG. 7 shows first example embodiments in accordance with the present disclosure. A first holographic reconstruction 700A of a first hologram is formed on a replay plane, and a second holographic reconstruction 700B of a second hologram is formed on the replay plane spatially displaced relative to the first holographic reconstruction 700A. Each of the first and second holographic reconstructions 700A, 700B comprises a zero-order replay field 710A, 710B and a corresponding plurality of higher order replay fields 720A, 720B, as in the outline schematic shown in FIG. 4.

The first holographic reconstruction 700A is formed on the replay plane by displaying the first hologram on a first array of light modulating pixels and illuminating the first array of pixels with light from a first light source at a first angle of incidence. The second holographic reconstruction 700B is formed on the replay plane by displaying the second hologram on a second array of light modulating pixels and illuminating the second array of pixels with light from the second light source at a second angle of incidence, different from the first angle of incidence. The first and second arrays of pixels may be formed on the same spatial light modulator or different spatial light modulators. The first and second holographic reconstructions 700A, 7008 are formed at different spatial positions on the replay plane. The first and second angles of incidence are chosen such that the zero-order replay field 710A of the first holographic reconstruction (herein called "first zero-order replay field") is positioned at a predetermined distance in the y direction relative to the zero-order replay field 7108 of the second holographic reconstruction (herein called "second zero-order replay field"). It may be said that the second zero-order replay field 7108 is spatially displaced relative to the first zero-order replay field 710A in the y direction. In the embodiment shown in FIG. 7, the second zero-order replay field 7108 is spatially displaced by a distance in the y direction corresponding to the dimension of a replay field in the y direction "Y1". In the illustrated example, the first zero-order replay field 710A and second zero-order replay field 7108 are immediately adjacent. In particular, the bottom edge of the first zero-order replay field 710A is substantially aligned with the top edge of the second zero-order replay field 710B.

Figure 8:
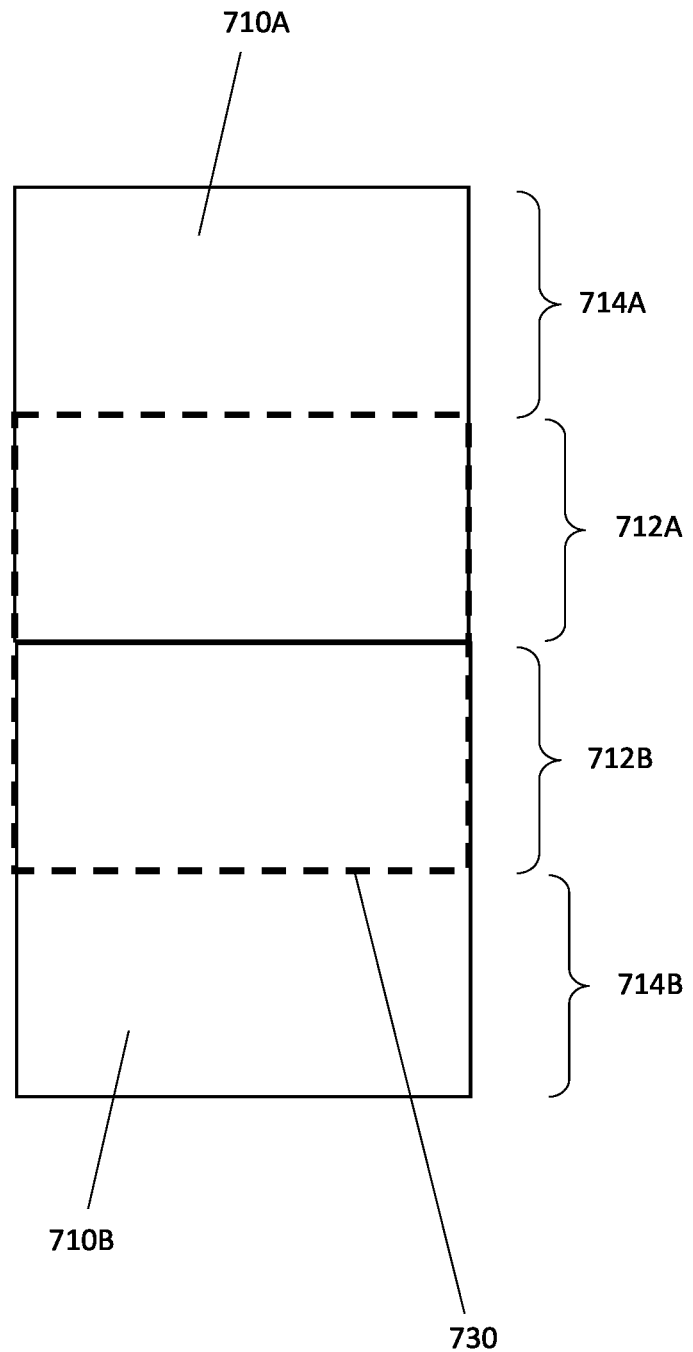
FIG. 8 shows a viewing window formed by respective sub areas of the zero-order replay field of the first holographic reconstruction and the zero-order replay field of the second holographic reconstruction of the embodiment of FIG. 7.

A viewing window 730, shown in bold outline in FIG. 7, is formed comprising a first sub area 712A of the first zero-order replay field 710A and a first sub area 712B of the second zero-order replay field 720B. The viewing window 730 is shown in more detail in the enlarged illustration shown in FIG. 8, where it is shown in dashed outline. In particular, as shown in FIG. 8, the first sub area 712A of the first zero-order replay field 710A comprises the lower half of the replay field and forms the top part of the viewing window 730, which may display far field image content as described above with respect to FIG. 6. The first sub area 712B of the second zero-order replay field 710B comprises the top half of the replay field and forms the bottom part of the viewing window 730, which may display near field image content as described above with respect to FIG. 6. In the illustrated embodiments, the split between the near field content/first zero-order replay field 710A and the far field content/second zero-order replay field 710B contained in the viewing window 710 is balanced (i.e. 50:50). That is, the first sub area 712A of the first zero-order replay field 710A forms an upper half of the viewing window 730 and the first sub area 712B of the second zero-order replay field 710B forms a lower half of the viewing window 730. Since the first zero-order replay field 710A is immediately adjacent, and positioned above, the second zero-order replay field 710B, the first sub area 712A of the first zero-order replay field 710A and the first sub area 712B of the second zero-order replay field 710B form a continuous display area—the viewing window 730. In other embodiments, the split between the first zero-order replay field and the second zero-order replay field contained in the viewing window may be unbalanced due to cropping, as described further below.

Figure 9A:
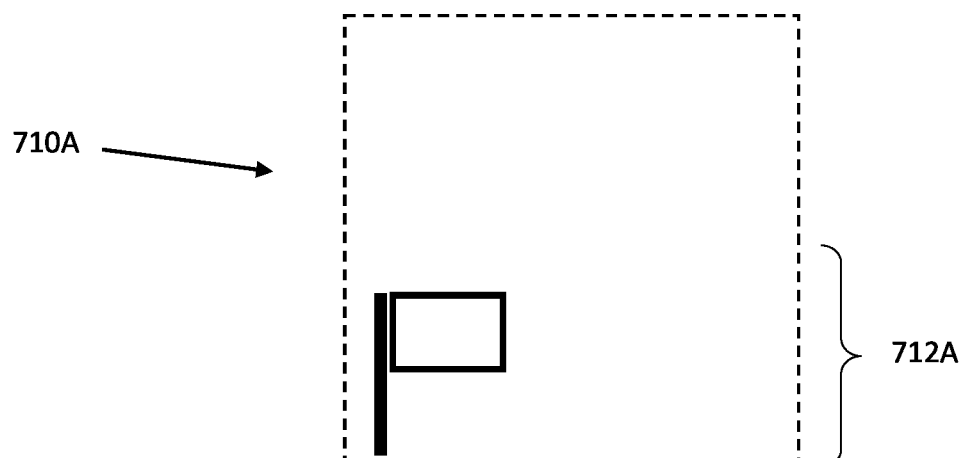
FIG. 9A shows an example of the real image content formed by the first holographic reconstruction of FIG. 7.
Figure 9B:
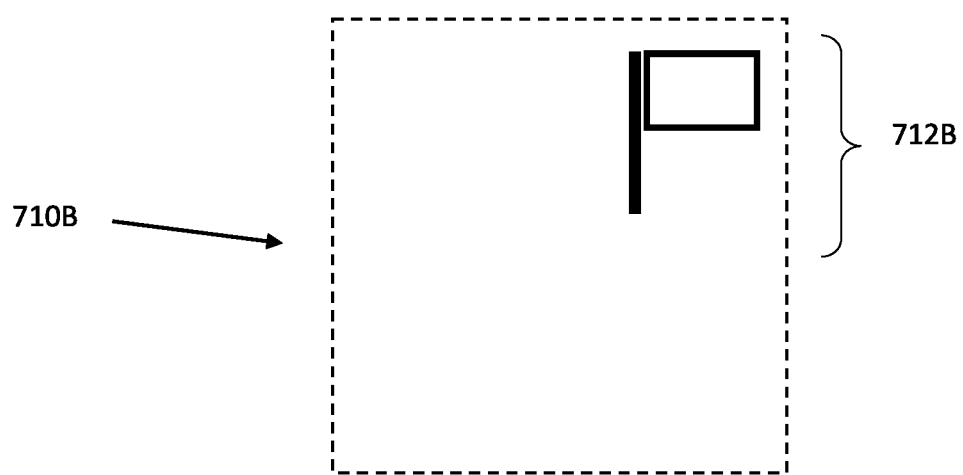
FIG. 9B shows an example of the real image content formed by the second holographic reconstruction of FIG. 7.

FIG. 9A shows an example of image content formed in the first zero-order replay field 710A, and FIG. 9B show an example of image content formed in the second zero-order replay field 710B. In particular, the real image content of the first holographic reconstruction (e.g. far field image content) is formed in the first sub area 712A of the first zero-order replay field 710A, and thus inside the viewing window 730. For example, as shown in FIG. 9A, a real image of a flag in an upright configuration is shown in the bottom left-hand corner of replay field 710A, and thus inside the first sub-area 712A. In some embodiments, the real image content of the first zero-order replay field 710A is restricted to the first sub area 712A thereof. Conjugate image content (not shown) of the first holographic reconstruction is formed outside the first sub area 712A, and thus outside the viewing window 730. In particular, the conjugate image content of the first holographic reconstruction may be formed in a second sub area 714A (e.g. the upper half) of the first zero-order replay field 710A as shown in FIG. 8. In some embodiments, the second sub area 714A of the first zero-order replay field 710A is restricted to conjugate image content of the first holographic reconstruction. Similarly, the real image content of the second holographic reconstruction (e.g. near field image content) is formed in the first sub area 712B of the second zero-order replay field 710B, and thus inside the viewing window 730. For example, as shown in FIG. 9B, a real image of a flag in an upright configuration is shown in the top right-hand corner of replay field 710B, and thus inside the first sub-area 712B. In some embodiments, the real image content of the second zero-order replay field 710B is restricted to the first sub area 712B thereof. Conjugate image content (not shown) of the second holographic reconstruction is formed outside the first sub area 712B, and thus outside the viewing window 730. In particular, the conjugate image content of the second holographic reconstruction may be formed in a second sub area 714B (e.g. the upper half) of the second zero-order replay field 710B as shown in FIG. 8. In some embodiments, the second sub area 714B of the second zero-order replay field 710B is restricted to conjugate image content of the second holographic reconstruction.

Accordingly, there is provided a holographic projector comprising a first array of light-modulating pixels arranged to display a first hologram and a second array of light-modulating pixels arranged to display a second hologram. A first light source is arranged to illuminate the first array of light-modulating pixels such that a first holographic reconstruction corresponding to the first hologram is formed on a replay plane. A second light source is arranged to illuminate the second array of light-modulating pixels such that a second holographic reconstruction corresponding to the second hologram is formed on the replay plane. The first holographic reconstruction comprises a first zero-order replay field and the second holographic reconstruction comprises a second zero-order replay field. The holographic projector is arranged such that the first zero-order replay field and the second zero-order replay field are no more than partially overlapping (e.g. adjacent or partially overlapping in the y direction). The real image content of the first holographic reconstruction is restricted to a first sub-area of the first zero-order replay field and real image content of the second holographic reconstruction is restricted to a first sub-area of the second zero-order replay field. The first sub-area of the first zero-order replay field and the first sub-area of the second zero-order replay field form a continuous display area (e.g. are immediately adjacent).

Thus, the first sub area of the first zero-order replay field and the first sub area of the second zero-order replay field form a continuous display area of the holographic projector that excludes conjugate image content of the first zero-order replay field and the second zero-order replay field.

In embodiments, the holographic projector is arranged so that only the first sub area 712A of the first zero-order replay field 710A and the first sub area 712B of the second zero-order replay field 7106 that form the viewing window 730 are formed on the replay plane. For example, masking, baffles or the like may be positioned in the optical path of the optical replay system of the holographic projector to prevent light forming the second sub area 714A of the first zero-order replay field 710A and the second sub area 714B of the second zero-order replay field 7106 from reaching the replay plane. In this way, conjugate image content of the zero-order replay fields 710A, 7106 is prevented from reaching the replay plane and so is not visible to a viewer.

As the skilled person will appreciate, the present disclosure requires the calculation of two separate holograms. However, each hologram includes only half of the image content of the desired image content for display. Thus, in an example comprising far field content and near field content for display in the viewing area, as in the arrangement of FIG. 6, first hologram comprises the far field content and second hologram comprises the near field content. Each hologram comprises only half the image content of a single hologram combining both near field and far field image content.

Second Embodiments—Overlapping First and Second Zero-Order Replay Fields

In the above-described first embodiments, the zero-order replay field of the first holographic reconstruction is immediately adjacent the zero-order replay field of the second holographic reconstruction, and the viewing window comprises equally-sized first sub areas of the respective first and second zero-order replay fields. This makes it possible to eliminate the conjugate image content of the first and second zero-order replay field from the viewing window so that it is not visible to a viewer. However, conjugate image content of higher order replay fields, in particular first order replay fields, may be formed within the viewing window, as described further below. Thus, undesirable ghost images may still be seen in the viewing window by a viewer.

Figure 10:
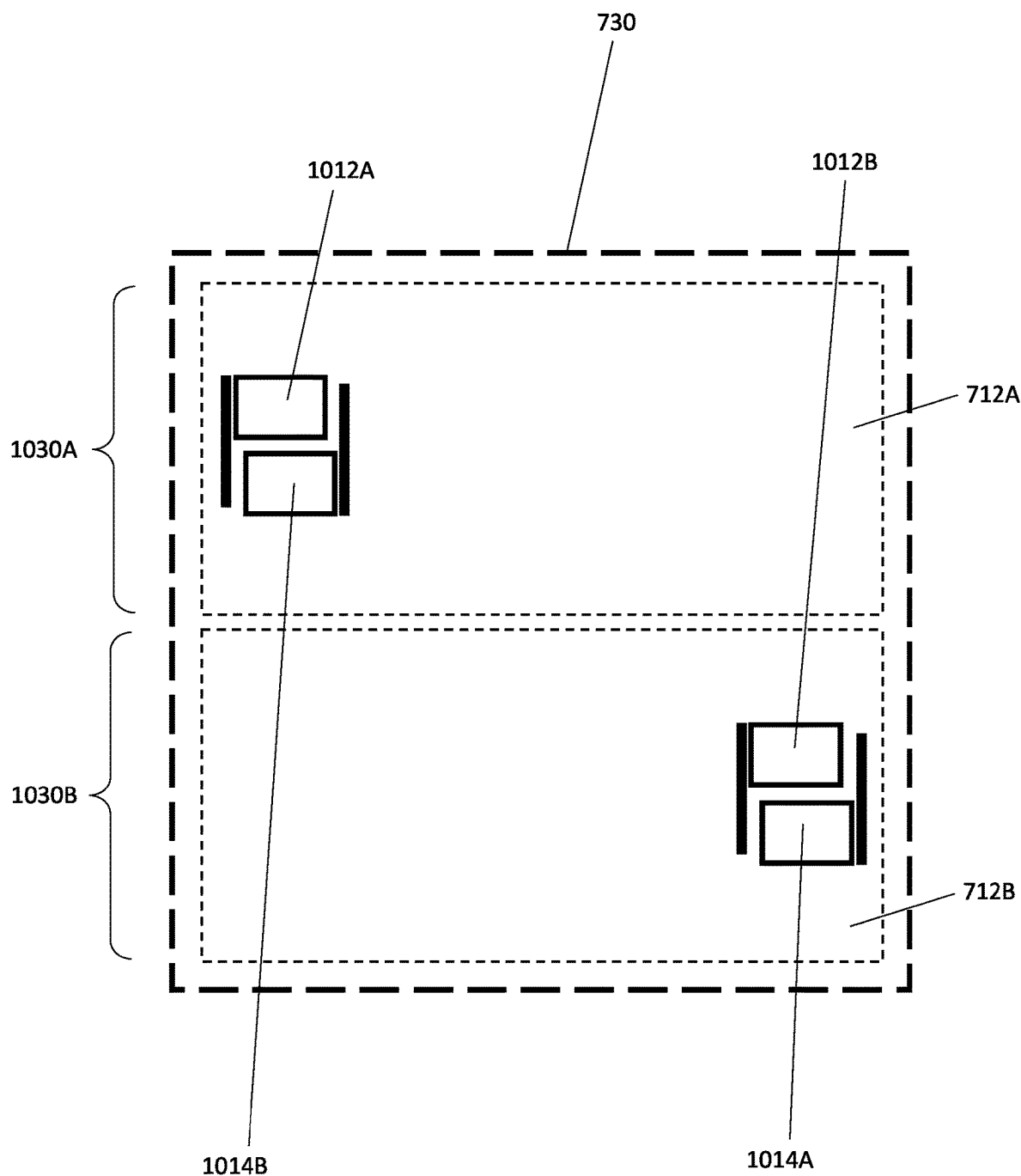
FIG. 10 shows an example of the real and conjugate image content formed by the first and second holographic reconstruction in the viewing window of FIG. 8.

FIG. 10 shows the viewing window 730 in accordance with the embodiment of FIG. 7. An upper half 1030A of the viewing window 730 comprises the first sub area 712A (lower half) of the first zero-order replay field 710A, comprising real image content 1012A. Real image content 1012A comprises a real image of a first flag in an upright configuration in the top left-hand corner of the upper half 1030A of viewing window 730. Thus, the first zero-order replay field 710A comprises the real image content 512 shown in FIG. 5. The first sub area 712A of the first zero-order replay field 710A may comprise the desired far field content. A lower half 1030B of the viewing window 730 comprises the first sub area 712B (upper half) of the second zero-order replay field 710B, comprising real image content 1012B. Real image content 1012B comprises a real image of a second flag in an upright configuration in the top right-hand corner of the lower half 1030B of viewing window 730. The first sub area 712B of the second zero-order replay field 710B may comprise the desired near field content. Thus, the viewing window 730 is balanced—with 50% of its area (upper half 1030A) for far field content and 50% of its area (lower half 1030B) for near field content.

Referring to FIG. 7, it can be seen that first zero-order replay field 710A of the first holographic reconstruction 700A coincides with (i.e. overlaps) the (0, +1) replay field of the second holographic reconstruction 700B. Similarly, the second zero-order replay field 710B of the second holographic reconstruction 700B coincides with (i.e. overlaps) the (0, −1) replay field of the first holographic reconstruction 700A.

Accordingly, as shown in FIG. 10, conjugate image content 1014B comprising the conjugate image of the second holographic reconstruction 700B (i.e. inverted second flag) in the (0, +1) replay field coincides with the first sub area 712A of the first zero-order replay field 710A in the upper half 1030A of the viewing window 730. Similarly, conjugate image content 1014A comprising the conjugate image of the first holographic reconstruction 700A (i.e. inverted first flag) in the (0, −1) replay field coincides with the first sub area 712B of the second zero-order replay field 710B in the lower half 1030B of the viewing window 730.

Accordingly, further embodiments of the present disclosure seek to suppress (e.g. reduce the intensity/brightness of) the conjugate image(s) of the first and second first-order replay fields that may appear in the viewing window, as described above. This may be achieved by partially overlapping the first and second zero-order replay fields (e.g. in the y direction). In example implementations, the amount of overlap and/or relative positioning of the first and second zero-order replay fields may be based on the brightness profile of the first holographic reconstruction (e.g. brightness profile in the y direction).

Figure 11:
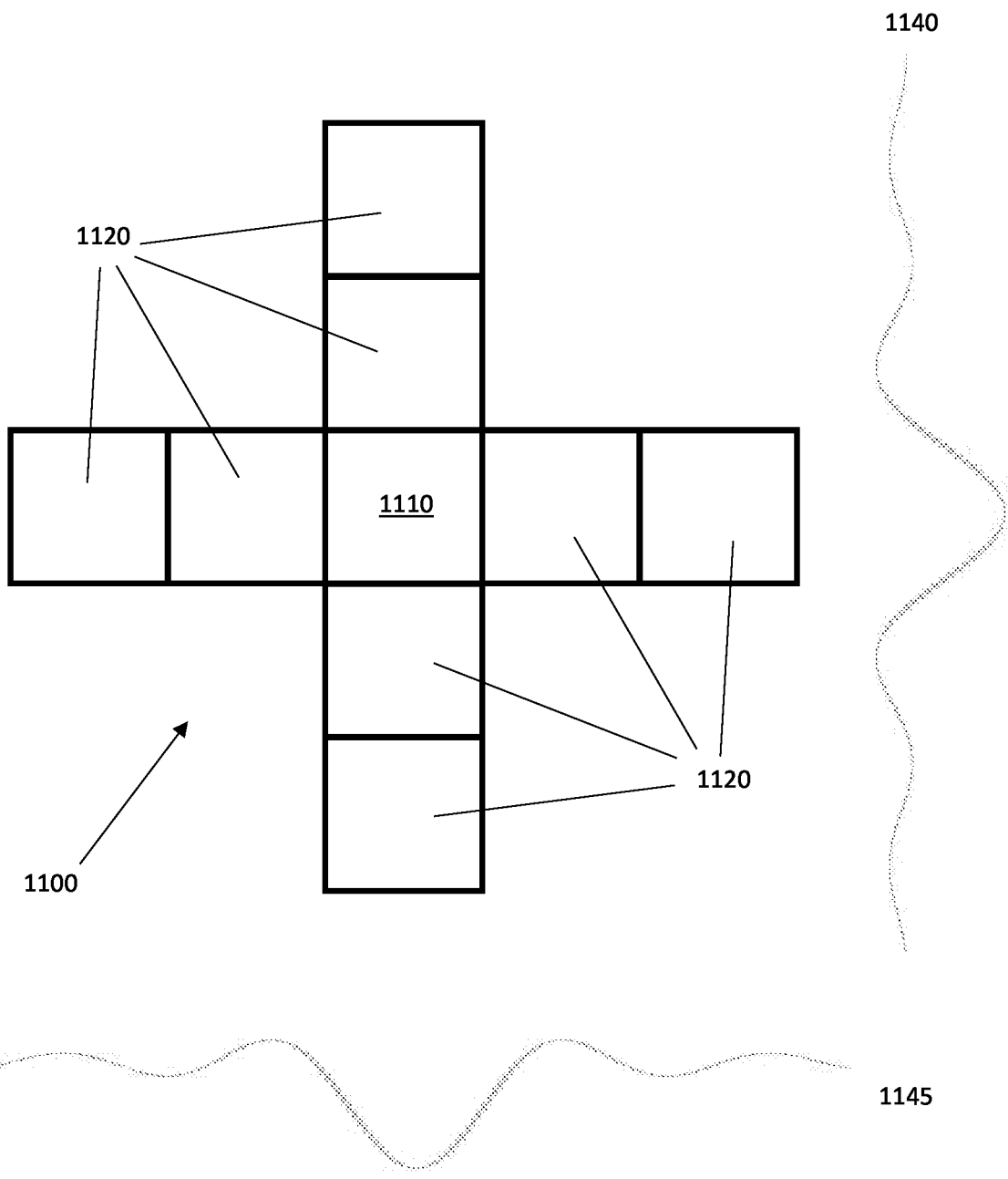
FIG. 11 shows a brightness profile of a holographic reconstruction formed on a replay plane in the x and y directions in accordance with embodiments.

FIG. 11 shows an example brightness profile 1140 of a holographic reconstruction 1100, comprising a zero-order replay field 1110 and a plurality of higher order replay fields 1120, formed on a replay plane in the y direction. FIG. 11 also shows a corresponding brightness profile 1145 of the holographic reconstruction 1100 in the x direction.

In the illustrated example, each light modulating pixel of the array of light modulating pixels of the spatial light modulator is square. This presents a square aperture. Diffraction by a square aperture forms an intensity/brightness profile 1140, 1145 in accordance with a sinc function in the x and y directions across the entire replay area (i.e. all replay fields). Thus, for a given holographic reconstruction, a primary maximum of the sinc function (i.e. maximum brightness) is coincident with the centre of the zero-order replay field 1110 in the x and y directions, and a plurality of (reduced brightness) maxima and minima of the sinc function occur at defined positions along the x and y axes to either side of the centre.

Figure 12:
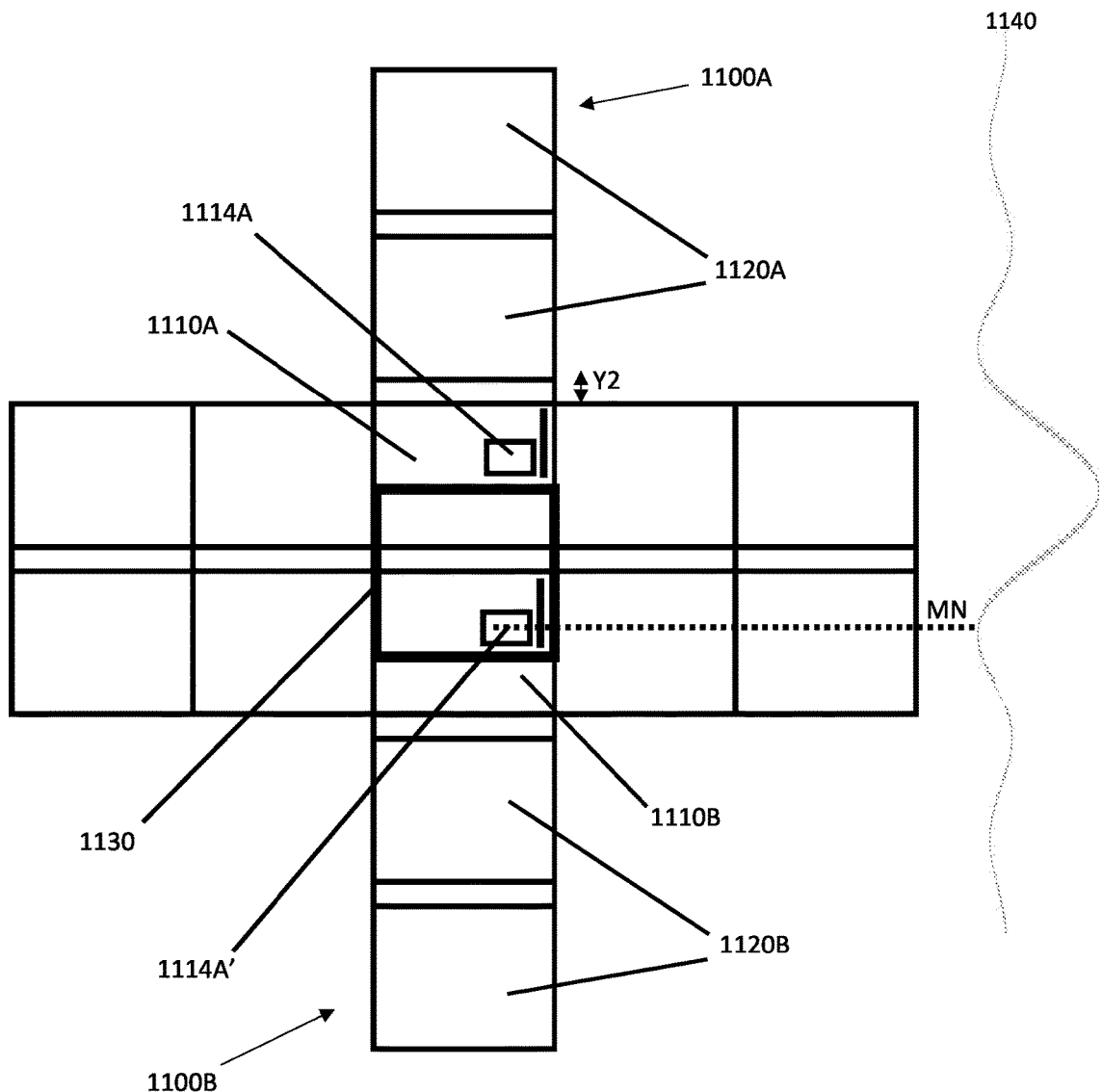
FIG. 12 shows a first holographic reconstruction formed on a replay plane positioned relative to a second holographic reconstruction formed on the replay plane in accordance with further embodiments.

FIG. 12 shows second example embodiments in accordance with the present disclosure, in which the first and second zero-order replay fields partially overlap. In particular, a first holographic reconstruction 1100A comprising a first zero-order replay field 1110A and a plurality of first higher order replay fields 1120A is formed on a replay plane, similar to the first holographic reconstruction 700A of the embodiment of FIG. 7. In addition, a second holographic reconstruction 1100B comprising a second zero-order replay field 1110B and a plurality of second higher order replay fields 1120B is formed on the replay plane, similar to the second holographic reconstruction 700B of the embodiment of FIG. 7. The second zero-order replay field 1110B is spatially displaced in the y direction with respect to the first zero-order replay field 1110A.

In the embodiment shown in FIG. 7, the second zero-order replay field 710B is spatially displaced with respect to the first zero-order replay field 710A by a distance in the y direction corresponding to the dimension of a replay field Y1 in the y direction, so that the first zero-order replay field 70A and second zero-order replay field 710B are immediately adjacent. However, in the embodiment shown in FIG. 12, the second zero-order replay field 1110B is spatially displaced in the y direction by a distance Y2, which is less that Y1, so that the second zero-order 1110B partially overlaps the first zero-order replay field 1110A in the y direction. The position of the second zero-order replay field 1110B relative to the first zero-order replay field 1110A is based on the brightness profile 1140 of the first holographic reconstruction 1100A in the y direction. In particular, the position of the first sub area (upper half) of the second zero-order replay field 1110B is positioned to coincide with a minimum MN in the brightness profile in the y direction (shown by dotted line in FIG. 12) of the first holographic reconstruction 1100A. In consequence, the intensity of the conjugate image 1114A' formed in the (0, −1) replay field of the first holographic reconstruction 1110A, which overlaps the first sub area of the second zero-order holographic reconstruction 1110B (forming the lower half of the viewing window 1130 as shown in FIG. 10), is minimised.

Accordingly, it may be said that the first sub area of the second zero-order replay field is positioned relative to the brightness profile of the first holographic reconstruction in order to supress the brightness of higher order conjugate image content of the first holographic reconstruction within the first sub area of the second zero-order replay field. In particular, the first sub area of the second zero-order replay field is substantially aligned with a minimum in the brightness profile of the first holographic reconstruction. For example, a central line (extending in the x direction) of the first sub area of the second zero-order replay field may be aligned with the brightness profile minimum, or a central line (extending in the x direction) of the conjugate image content thereof may be aligned with the brightness profile minimum.

As previously described, the relative positions of the first and second zero-order replay fields may be controlled by varying the position/angle of the first/second light source relative to the first/second array of light modulating pixels. Thus, the angle of incidence of light of the first light source on the first array of light modulating pixels may be different from the angle of incidence of light of the second light source on the second array of light modulating pixels in order to achieve the relative positions, and thus the alignment of the first sub-area of the second zero-order replay field and the brightness profile of the first holographic reconstruction.

Referring again to FIG. 12, when positioning the second zero-order replay field 1110B to partially overlap the first zero-order replay field 1110A, a consideration is where to define the viewing window 1130. In particular, if a lower part of the viewing window 1130 were defined to capture exactly the upper half of the second zero-order replay field 1110B, the upper part of the viewing window 1130 will capture a part of the upper half (e.g. second sub area) of the first zero-order replay field 1110A—the amount of the upper half of the first zero-order replay field 1110A contained in the viewing window being dependent on the amount of overlap. However, the upper half of the first zero-order replay field 1110A includes the conjugate image 1114A thereof. Thus, if the upper part of the viewing window 1130 were to have the same dimension as the lower part thereof, a part of the conjugate image 1114A of the first zero-order replay field 1110A may be contained within the viewing window 1130.

In some embodiments, the viewing window 1130 is reduced in size so as to avoid capturing the conjugate image 1114A of the first zero-order replay field 1110A. In particular, as shown in FIG. 12, the upper boundary of the viewing window 1130 is moved down so as to exclude unwanted image content such as the conjugate of the first-order replay field of the second reconstruction 1100B. Thus, the viewing window 1130 is reduced in size (i.e. reduced in y dimension/height). The lower part of the viewing window 1130 still contains the upper half of the second zero-order replay field 1110B but the upper part of the viewing window 1130 contains the lower half of the first zero-order replay field 1110A but cropped in the y direction. Thus, the split between image content of the first and second zero-order replay fields in the viewing window 1130 is changed. Instead of comprising exactly half the first zero-order replay field 1110A and exactly half the second zero-order replay field 1110B, as in the viewing window 730 of the embodiment of FIG. 7, the viewing window 1130 is unbalanced—it includes more of the second zero-order replay field 1110B than the first zero-order replay field 1110A.

As the skilled person will appreciate, reducing the overall size of the viewing window and/or unbalancing the respective areas for near field and far field content may be undesirable. Thus, there is a trade-off between reducing the size of the viewing window to exclude conjugate image content, whilst providing adequate area in the viewing window for the desired image content of the first and second holographic reconstructions. Accordingly, the position and size of the viewing window may be varied according to application requirements.

The above described embodiments illustrate a viewing window that is split horizontally; the first and second holographic reconstructions are spatially displaced in the y direction. Thus, in the example of FIG. 10, conjugate images of the first and second first order replay fields in the y direction appear in the viewing window. However, the skilled person will appreciate that, in other examples, conjugate images of the first and second first order replay field in the x direction (e.g. (−1, 0) or (+1, 0)) may appear in the viewing window. For example, if the viewing window is split vertically, so that image content from a first holographic reconstruction is captured in the left-hand side of the viewing window and image content from a second holographic reconstruction is captured in the right-hand side of the viewing window. Thus, the principles of positioning (and overlapping) the first and second holographic reconstructions on the replay plane to be spatially displaced relative to each other, in accordance with the present disclosure, apply equally to spatial displacement in the x direction.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, each light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents. Features as described throughout the specification as filed and in the appended claims can be combined together in any fashion that is not technically or logically inconsistent.

The invention claimed is:

1. A holographic projector comprising:
a first array of light-modulating pixels arranged to display a first hologram of a first image and a second array of light-modulating pixels arranged to display a second hologram of a second image, wherein an image content of the first image is different from an image content of the second image;
a first light source arranged to illuminate the first array of light-modulating pixels such that a first holographic reconstruction corresponding to the first hologram is formed on a replay plane and a second light source arranged to illuminate the second array of light-modulating pixels such that a second holographic reconstruction corresponding to the second hologram is formed on the replay plane, wherein the first holographic reconstruction comprises real and conjugate image content formed in a first zero-order replay field and the second holographic reconstruction comprises real and conjugate image content formed in a second zero-order replay field,
wherein the holographic projector is arranged such that:
the first zero-order replay field and the second zero-order replay field are either adjacent or partially overlapping;
the real image content of the first holographic reconstruction is restricted to a first sub-area of the first zero-order replay field and the real image content of the second holographic reconstruction is restricted to a first sub-area of the second zero-order replay field, and
the first sub-area of the first zero-order replay field and the first sub-area of the second zero-order replay field form a continuous display area of the holographic projector, wherein the conjugate image content of the first holographic reconstruction is restricted to a second sub-area of the first zero-order replay field and the conjugate image content of the second holographic reconstruction is restricted to a second sub-area of the second zero-order replay field, and wherein the continuous display area is achieved by masking out the second sub-area of the first zero order replay field and the second sub-area of the second zero order replay field such that the continuous display area of the holographic projector formed excludes the conjugate image content of the first and the second holographic reconstructions.

2. A holographic projector as claimed in claim 1 wherein the first zero-order replay field and second zero-order replay field are adjacent.

3. A holographic projector claimed in claim 2 wherein the first zero order replay field is formed above the second zero order replay field, and/or the continuous display area comprises a lower part of the first zero-order replay field and an upper part of the second zero-order replay field.

4. A holographic projector as claimed in claim 1 wherein the first zero-order replay field and second zero-order replay field are partially overlapping.

5. A holographic projector claimed in claim 4 wherein the light-modulating pixels are shaped such that the brightness profile of each holographic reconstruction is a sinc function in at least one direction on the replay plane.

6. A holographic projector as claimed in claim 5 wherein the position of the first sub-area of the second zero-order replay field is based on the brightness profile of the first holographic reconstruction.

7. A holographic projector as claimed in claim 5 wherein the first sub-area of the second zero-order replay field is positioned relative to the brightness profile of the first holographic reconstruction in order to supress the brightness of higher-order conjugate image content of the first holographic reconstruction within the first sub-area of the second zero-order replay field.

8. A holographic projector as claimed in claim 5 wherein the first sub-area of the second zero-order replay field is substantially aligned with a minimum in the brightness profile of the first holographic reconstruction.

9. A holographic projector as claimed in claim 1 wherein the angle of incidence of light of the first light source on the first array of light-modulating pixels is different to the angle of incidence of light of the second light source on the second array of light-modulating pixels.

10. A holographic projector as claimed in claim 1 wherein the first and second holographic reconstructions each comprise a respective plurality of higher-order replay fields that replicate the corresponding zero-order replay field.

11. A holographic projector as claimed in claim 1 wherein the first zero-order replay field is positioned above the second zero-order replay field on the replay plane.

12. A holographic projector claimed in claim 11 wherein the first holographic reconstruction comprises far field image content and the second holographic reconstruction comprises near field image content.

13. A holographic projector as claimed in claim 1 wherein the first array of light modulating pixels and the second array of light modulating pixels are formed on a single spatial light modulator.

14. A head-up display or a head-mounted display comprising the holographic projector as claimed in claim 1.

15. A method of holographic projection comprising:
displaying a first hologram of a first image on a first array of light modulating pixels, and displaying a second hologram of a second image on a second array of light modulating pixels, wherein an image content of the first image is different from an image content of the second image;
illuminating the first array of light modulating pixels using a first light source so as to form a first holographic reconstruction corresponding to the first hologram on the replay plane, and illuminating the second array of light modulating pixels using a second light source so as to form a second holographic reconstruction corresponding to the second hologram on the replay plane, wherein the first holographic reconstruction comprises real and conjugate image content in a first zero-order replay field and the second holographic reconstruction comprises real and conjugate image content in a second zero-order replay field, wherein the real image content of the first holographic reconstruction is restricted to a first sub-area of the first zero-order replay field, and the real image content of the second holographic reconstruction is restricted to a first sub-area of the second zero-order replay field, and wherein the conjugate image content of the first holographic reconstruction is restricted to a second sub-area of the first zero-order replay field and the conjugate image content of the second holographic reconstruction is restricted to a second sub-area of the second zero-order replay field;
positioning the first zero-order replay field relative to the second zero-order replay field to be either adjacent or partially overlapping such that the first sub area of the first zero-order replay field and the first sub-area of the second zero-order replay field form a continuous display area; and
masking out the second sub-area of the first zero order replay field and the second sub-area of the second zero order replay field such that the continuous display area formed excludes the conjugate image content of the first and the second holographic reconstructions.

16. A method as claimed in claim 15 wherein positioning the first zero order replay field relative to the second zero order replay field comprises:
arranging the first light source so that the light incident on the first array of light-modulating pixels has a first angle of incidence so that the first zero order replay field is formed at a first position on the replay plane, and
arranging the second light source so that the light incident on the second array of light-modulating pixels has a second angle of incidence, wherein the second angle of incidence is different from the first angle of incidence, so that the second zero order replay field is formed at a second position on the replay plane that is spatially displaced relative to the first position.

17. A method as claimed in claim 15 comprising arranging the second light source so that the second zero order replay field is immediately adjacent or partially overlapping the first zero order replay field.

18. A method as claimed in claim 15 comprising defining a viewing window to contain only the first sub-area of the first zero order replay field and the first sub-area of the second zero order replay field forming the continuous display area or a substantial part thereof.

* * * * *